United States Patent
Hsu et al.

(10) Patent No.: US 6,717,922 B2
(45) Date of Patent: Apr. 6, 2004

(54) NETWORK CONFIGURATION PROTOCOL AND METHOD FOR RAPID TRAFFIC RECOVERY AND LOOP AVOIDANCE IN RING TOPOLOGIES

(75) Inventors: Ivy Pei-Shan Hsu, Pleasanton, CA (US); Rajkumar Jalan, Saratoga, CA (US); Gurudeep Kamat, Mountain View, CA (US); Andrew Tai-Chin Kuo, Newark, CA (US); Jordi Moncada-Elias, Milpitas, CA (US)

(73) Assignee: Foundry Networks, Inc., San Jose, CA (US)

( * ) Notice: Subject to any disclaimer, the term of this patent is extended or adjusted under 35 U.S.C. 154(b) by 19 days.

(21) Appl. No.: 10/090,669

(22) Filed: Mar. 4, 2002

(65) Prior Publication Data

US 2003/0165119 A1 Sep. 4, 2003

(51) Int. Cl.[7] .............................................. H04L 12/28
(52) U.S. Cl. ........................ 370/258; 370/403; 370/242
(58) Field of Search ................................ 370/216, 225, 370/241, 242, 244, 254, 256, 258, 401, 403, 404, 405, 452; 709/200, 208, 209, 251; 714/4

(56) References Cited

U.S. PATENT DOCUMENTS

| 6,032,194 | A | * | 2/2000 | Gai et al. .................... 709/239 |
| 6,304,575 | B1 | * | 10/2001 | Carroll et al. ............... 370/408 |
| 6,373,826 | B1 | * | 4/2002 | Russell et al. ............... 370/256 |
| 6,535,490 | B1 | * | 3/2003 | Jain ........................... 370/256 |
| 2001/0021177 | A1 | * | 9/2001 | Ishii ........................... 370/256 |
| 2002/0186667 | A1 | * | 12/2002 | Mor et al. ................... 370/258 |
| 2003/0048501 | A1 | * | 3/2003 | Guess et al. ................ 359/118 |

OTHER PUBLICATIONS

Chakraborty. "Improvement in Reliability of the Token Ring Network by Reversal of Token in Case of a Single Component Failure". IEEE. 1993. Pp. 1152–1154.*
Latif et al. "The IBM 8209 LAN Bridge". IEEE Network. May 1992. Pp. 28–37.*

(List continued on next page.)

Primary Examiner—Chi Pham
Assistant Examiner—Derrick W Ferris
(74) Attorney, Agent, or Firm—Brown Raysman Millstein Felder & Steiner LLP

(57) ABSTRACT

A network configuration protocol and algorithm are described which resolve deficiencies with existing protocols. A large network having many bridges may be built as a combination of smaller networks, many of which may each be arranged in a ring topology. Each ring may be monitored by a single master bridge regularly sending control packets, and each other bridge in the ring does not make decisions with respect to its status. A loop free topology is achieved by selectively blocking and unblocking data traffic in one of the ring ports of the single master bridge for the ring, while all other bridges in the ring keep their ports in non-blocked states. In multiple ring topologies, each ring has a single master bridge which chooses one of its ports to be blocking. When rings are connected through a shared link formed between two shared bridges, rings with higher priorities carry control packets of rings with lower priorities so that, in case of failure of the shared link, a single ring may be formed from the connected rings with only the master bridge of the higher priority ring aware of and monitoring the larger ring. In case of any link failure inside a given ring, the master bridge quickly detects the failure and automatically changes its blocking port to a non-blocking state in which traffic may flow and follow an alternate path, avoiding the failed link.

25 Claims, 11 Drawing Sheets

OTHER PUBLICATIONS

Novell, Source Routing and the Spanning–Tree Protocol, Robert L. Perry, Paul Turner, Aug., 1991, 38 pages, http://developer.nov/research/appnotes/1991/august/01.

Tech Brief, Redundancy in the Application–Aware Data Center, Extreme Networks, 6 pages; www.extremenetworks.com.

Virtual Router Redundancy Protocol (vrrp), 31 pages, http://www.ietf.org/html.charters/vrrp–charter.html.

Spanning Tree Software Package, Products, 3 pages, http://www.tassogroup.com/products.html.

Minimum Spanning Tree Demonstration Program; 1 page, http://www.engr.orst.edu/~girardma/javaProgs/minST/MinST.html.

Intel® Express 460T Standalone Switch Description of Spanning Tree Protocol, 1 page, http://support.intel.com/support/express/switches/460/30280.htm.

Understanding Spanning–Tree Protocol, 8 pages, Copyright 1989–1997, Cisco Systems Inc.

Whatis.com Word of the Day, 2 pages, Copyright 2000–2002, Tech Target.

* cited by examiner

FIG. 1A  FIG. 1B

| Protocol identifier - 2 bytes - |
| Protocol version - 1 byte - |
| Flags - 2 bytes - |
| Vlan identifier - 2 bytes - |
| Ring identifier - 2 bytes - |
| Master identifier - 2 bytes - |
| Sequence number - 2 bytes - |
| Hello time - 2 bytes - |

NETWORK CONFIGURATION PROTOCOL AND METHOD FOR RAPID TRAFFIC RECOVERY AND LOOP AVOIDANCE IN RING TOPOLOGIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to network configuration protocols and, in particular, to improved configuration protocols and methods for facilitating rapid traffic recovery following a link failure while still preventing loops from occurring in ring topologies.

Two basic requirements for computer networks are the availability of redundancy and the prevention of loops. Redundancy is needed so that a fault or break in a device or path in the network does not cut off traffic flow in the network. Loops occur when a network has multiple active paths between devices at any given time, resulting in the duplication of messages. Loops are prevented by keeping only one path between devices active at any given time. Since both redundancy and loop prevention involve configuration and selection of active and inactive paths, a network must carefully manage the states of its paths to meet both needs.

One solution to the problem of providing redundancy while preventing loops is the spanning tree algorithm or protocol. The spanning tree protocol, defined in IEEE 802.1, is used by bridges in a network to dynamically discover a subset of the network topology that provides path redundancy while preventing loops. Spanning tree protocol provides redundancy by defining a single tree that spans the bridges and maintaining all other paths and connections in a standby or blocked state. The protocol allows bridges to transmit messages to one another that allow each bridge to select its place in the tree and which states should be applied to each of its ports to maintain that place. For example, a port in a given bridge that is connected to an active path at a given time is kept in a forwarding state, in which all data traffic is received and transmitted to the next portion of the network, and a port in the bridge that is connected to an inactive path is kept in a non-forwarding state such as a blocking state in which traffic is blocked through that port.

In particular, bridges in a spanning tree network pass bridge protocol data units, or BPDUs, to one another which contain information including root, bridge and port identifiers and path cost data. This information is used by the bridges, among other things, to "elect" one of the bridges in the spanning tree network to be a unique root bridge for the network, to calculate the shortest, least cost path from each bridge to the root bridge, to select which ports will be blocking, and for each LAN, elect one of the bridges residing in the LAN to be a designated bridge. In brief, the election of a root is performed by each bridge initially assuming itself to be the bridge, each bridge transmitting root BPDUs, each bridge comparing its BPDU information with that received from other bridges, and each bridge deciding whether to stop serving as a root and stop transmitting BPDUs when the configuration of another bridge as root is better than this bridge serving as root. Ports being converted from blocking to forwarding states and back again undergo several possible transition states depending upon the BPDUs received. Once the bridges have all reached their decisions, the network stabilizes or converges, and is eventually loop-free. A similar process is followed after a link failure has occurred in the network, in which case a new root and/or new active paths must be found.

The spanning tree algorithm presents several difficulties, particularly for large networks such as metropolitan area or wide area networks. The spanning tree protocol requires each bridge to perform complex calculations and comparisons related to path costs, which requires substantial processing resources and time. In addition, convergence under the spanning tree algorithm does not occur until all bridges have exchanged messages and evaluated the path costs. Thus, spanning tree has a relatively high convergence time and requires the use of heavy computing resources. Moreover, spanning tree has a seven bridge topology limitation. Thus, spanning tree protocol reduces performance in, and is not entirely adequate for use with, large networks such as MANs and WANs.

Other existing protocols, such as the health check mechanism available in devices offered by, for example, Extreme Networks, provide simplistic fault recovery solutions for use in very basic network configurations. However, no mechanism is available to the best of the inventors' knowledge for allowing such simple solutions to be extended to more complex network configurations, except through the use of spanning tree protocol as discussed above. There is therefore a need for alternative network configuration solutions which provide redundancy and loop free operation but which use minimal computing resources and converge quickly even when used in large networks.

SUMMARY OF THE INVENTION

The present invention provides a network configuration protocol and algorithm which resolves deficiencies with prior protocols. The present invention relies on the appreciation that a large network having many bridges may be built as a combination of smaller networks, many of which may each be arranged in a ring topology. Because ring topology configuration is predetermined, a shorter configuration control packet protocol may be used for each ring to manage redundancy and loop free operation. In addition, each ring may be controlled by a single master bridge, selected for example by a system administrator, and each other bridge in the ring need not and does not make decisions with respect to its status. Finally, only the master bridge needs to change the status of its ports to effect redundancy. Thus, the use of computing resources in each ring and in the network as a whole is kept to a minimum, and redundancy is provided with minimal looping and extremely rapid convergence times.

Thus, in accordance with the invention, a ring loop free topology is achieved by means of selectively blocking and unblocking data traffic in one of the ring ports of a single master bridge for the ring. All other bridges in the ring keep their ports in non-blocked states. In multiple ring topologies, each ring has a single master bridge which chooses one of its ports to be blocking. In case of any link failure inside a given ring, the master bridge quickly detects the failure and automatically changes its blocking port to a non-blocking state in which traffic may flow and follow an alternate path, avoiding the failed link. When a failed link gets restored, the master bridge quickly detects the link restoration and converts its port back to a blocking state to avoid a loop from occurring. Since each ring in the network governs its own link redundancy and loop avoidance, each ring may be connected to other rings or other network environments running other protocols, including spanning tree protocols or other proprietary protocols.

To support large network configurations consisting of connected rings, the invention provides methodologies and data fields in the control packet protocol for coordinating control between connected rings. When two rings are connected through a shared link formed between two shared bridges, e.g., bridges which have ports belonging to the two connected rings, at least one of the rings carries the control packets being forwarded around the other ring. In some embodiments, the ring having the higher priority as between the two connected rings carries the control packets of the lower priority ring. The control packets are preferably marked as native to the lower priority ring, and thus foreign to the higher priority ring, before they are forwarded on to the higher priority ring.

In the event of failure of the shared link, the two connected rings form one large ring. Since the control packets for the lower priority ring are circulating around the entire ring, it does not detect the failure and thus keeps its blocking port from going into a forwarding state. Since the control packets for the higher priority ring do not circulate the entire larger ring, the master bridge for the higher priority ring detects the failure of the shared link and converts its blocking port to a forwarding state to provide fault recovery for the larger shared ring. In effect, the master bridge for the higher priority ring retains responsibility for providing fault recovery and loop free operation for the larger, combined ring.

Thus, in accordance with one aspect, the invention provides a method for coordinating control of fault recovery between connected rings in a network, each ring being assigned a priority value different than priority values of other connected rings. The method involves monitoring health of each ring through the use of control packets regularly transmitted and expected to be received by a master bridge of each ring, the master bridge converting one of its ports from a blocking state to a non-blocking state if a control packet is not received within an expected time delay from transmission. The method further includes each ring forwarding control packets belonging to the ring and any other connected ring having lower priority than the ring. When the network has at least one shared link between two connected rings, the method includes, if the shared link fails, forming a single ring from the two connected rings and the master bridge for the ring having the highest priority monitoring health of the formed single ring.

In accordance with another aspect of the invention, a method is described herein for use in a network topology comprising a plurality of rings, each ring having a plurality of bridges each having a plurality of ports, two of which ports belong to the respective ring. One of the plurality of bridges in each ring serves as a master bridge for the ring, the master bridge having a first port belonging to the first ring which is convertible between a blocking state and a non-blocking and a second port being maintained in a non-blocking state. All ports for other bridges belonging to each ring other than the master bridge are maintained in non-blocking states.

The inventive method according to this aspect of the invention facilitates rapid traffic recovery while avoiding loops, and involves regularly transmitting first control packets from a first master bridge onto a first ring, the first control packets each including a first ring identifier identifying the first ring, and regularly transmitting second control packets from a second master bridge onto a second ring, the second control packets each including a second ring identifier identifying the second ring. The one or more other bridges in the first ring forward the first control packets and, when available to the first ring, any second control packets. If any first or second control packet is not received by the convertible blocking port for the first or second master bridge, respectively, within a set delay time from transmission of such first or second control packet, then the convertible port for the first or second master bridge, respectively, is converted from a blocking state to a non-blocking state. This opens that port up for traffic, thus compensating for a fault in the ring which occurred and caused the delay in receipt of the respective control packet.

If the first master bridge convertible port receives one or more subsequent first control packets while in a non-blocking state, and the number of subsequent first control packets received equals or exceeds a set threshold number, the master bridge convertible port is converted from a non-blocking state back to a blocking state. The set threshold may be one or may be more than one, in which case the master bridge counts the number of control packets received for comparison to the set threshold. This prevents a loop from forming when the failed link is restored, as determined by the timely receipt of the subsequent control packet.

In some embodiments, the control packets include a topology change flag. The first or second master bridge sets the topology change flag in at least one control packet transmitted following conversion of the first or second master bridge first port from a blocking state to a non-blocking state or from a non-blocking state to a blocking state. The other bridges in the first and second rings each store bridging tables, and, upon receipt of a control packet having a set topology change flag, each of the other bridges flushes its stored bridging table.

The non-blocking state discussed herein may include a forwarding state, in which all data traffic including control packets are processed and forwarded. Alternatively, an additional, intermediary non-blocking state is provided in which data traffic continues to be blocked but control packets are processed and forwarded. This extra non-blocking state, referred to herein as a pre-forwarding state, allows for staged transitions from blocking to forwarding states while the master bridge determines more definitively whether it needs to go to a fully forwarding state. The pre-forwarding state also allows for time while other events in the ring which may impact on the fault are resolved. If any first or second control packet is not received by the first or second master bridge convertible port, respectively, within a second set delay time from transmission of such control packet from the first or second master bridge, then the master bridge convertible port is converted from a pre-forwarding state to a forwarding state.

In some configurations, at least one bridge is a shared bridge having a shared port belonging to both the first and second rings. The first ring has a higher priority than the second ring, and a port identifier is assigned to the shared port which matches the ring identifier for the first, higher priority ring. A second control packet received by a port in the shared bridge belonging to the second ring is marked, and, in each port of the shared bridge belonging to the second ring, a received marked control packet having a ring identifier which is the same as the port identifier of the port is de-marked. A received marked control packet having a ring identifier with a higher priority than the port identifier is dropped. These decisions facilitate circulation of control packets for lower priority rings around the higher priority rings, thus putting the higher priority rings in a position to assume control over fault recovery in the event of failure of the shared link.

In accordance with another aspect, the invention includes a computer readable medium storing a data structure defining a network configuration control packet protocol used by a ring topology in which each of a plurality of bridges has two ports belonging to a first ring. One of the bridges in the ring serves as a master bridge for the first ring, and a first master bridge port belonging to the first ring is maintained in a non-blocking state and a second master bridge port belonging to the first ring is convertible between a blocking state and one or more non-blocking states. The inventive control packet protocol includes, among other data fields, a ring identifier representing a value of a ring to which the control packet applies, a foreign status flag representing whether the control packet is native to the first ring or belongs to a second ring in the network and is thus foreign to the first ring, and a topology change flag settable by the master bridge upon conversion of the state of the master bridge second port. The control packet is used by the master bridge, in accordance with methodologies described herein, to indicate whether a traffic link has failed or been restored in the ring, to determine whether to convert the second port from one state to another, and to notify non-master bridges in the ring of conversion of the second port.

In some embodiments, the control packet further contains a master identifier representing the master bridge of the ring to which the control packet applies, a hello time field representing a time period in which the control packet is regularly sent by the master bridge, and a forwarding bit which is set by the master bridge to notify other bridges in the ring to go to a forwarding state from an intermediary or pre-forwarding state when, for example, the master bridge sets one of its ports to a blocking state.

In accordance with a further aspect of the invention, a network is described herein in which each of a plurality of bridges has two ports belonging to a first ring. The network comprises a master bridge in which a first port belonging to the first ring is maintained in one or more non-blocking states and a second port is convertible between a blocking state and one or more non-blocking states. The master bridge comprises transmission means for regularly transmitting first control packets onto the first ring, the control packets each including a ring identifier identifying the first ring. The network further contains one or more non-master bridges in which both ports belonging to the first ring are maintained in non-blocking states, the non-master bridges forwarding first control packets and second control packets belonging to a second ring connected to the first ring. A program means is provided in the master bridge for converting the convertible port from a blocking state to a non-blocking state if a first control packet is not received by the master bridge within a first delay time from transmission of such first control packet from the master bridge and for converting the convertible port from a non-blocking state to a blocking state if a first control packet is received by the second port within a second delay time from transmission of the first control packet from the master bridge first port.

In some embodiments, the network comprises means for distinguishing between first control packets belonging to the ring and second control packets belonging to the second ring. The means for distinguishing between first and second control packets may comprise a foreign status flag in the control packets which is set when a control packet belongs to the second ring, and may further include program code residing in the bridges in the first ring which, when executed, causes the bridges to detect the foreign status flag in each control packet and to determine whether each control packet belongs to the first or second ring.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 1A–1C are diagrams showing various exemplary ring topologies;

DETAILED DESCRIPTION OF THE PREFERRED EMBODIMENTS

Figure 1C:
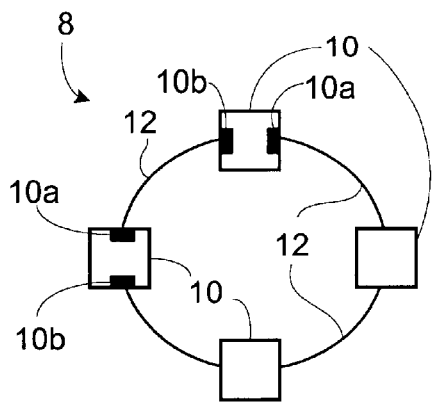
Figure 1C:
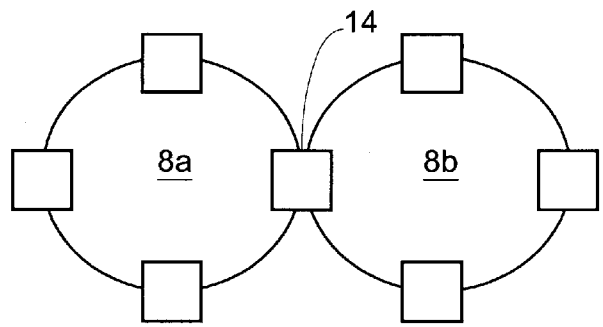
Figure 1C:
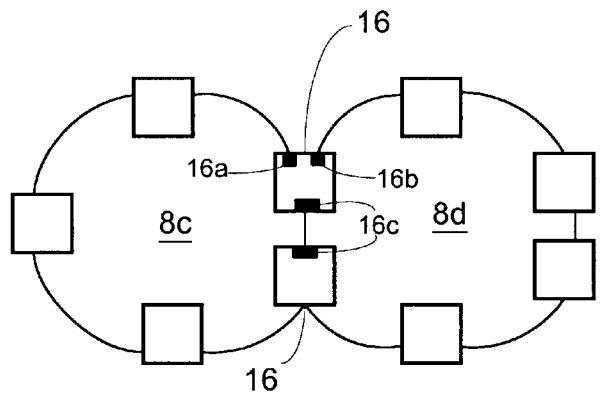

Embodiments of the present invention are now described in detail with reference to the drawings in the Figures. As described in more detail, the present invention provides techniques and a control packet protocol for supporting rapid fault recovery while avoiding loops in ring topologies. Generally, and for purposes of the description of the preferred embodiments, a ring topology is a network configuration formed when Layer 2 bridges are placed in a circular fashion with each bridge having two and only two ports belonging to a specific ring. FIGS. 1A–1C show different examples of ring topologies. FIG. 1A shows a single ring 8 having bridges 10 connected by paths 12. Each bridge in the ring 8 in FIG. 1A has two ports 10a and 10b belonging to the ring. FIG. 1B shows two adjacent rings, 8a and 8b, with a single bridge 14 having two ports belonging to each ring.

In FIGS. 1a and 1b, no links or bridges are shared among rings. In FIG. 1C, two rings 8c and 8d are connected and share two bridges 16. Each bridge 16 has two ports 16a and 16b which are uniquely belong to only one ring, ring 8c and 8d respectively, and one port 16c connected to a path which is shared by both rings. When rings are assigned different priority levels, the ports 16c connected to the shared link assume the priority value of the higher priority ring, and ports (e.g., 16a or 16b) in shared bridges 16 connected to the lower priority ring are deemed to be customer ports. The use of a shared link between shared bridges 16 allows for the connection of rings and the growth of a larger network from smaller ring components; however, the shared link also presents difficulties since its failure affects both rings 8c and 8d. The problem of providing loop free but rapid fault recovery for this connected ring topology is solved using the present invention, as explained in greater detail below.

Figure 2:
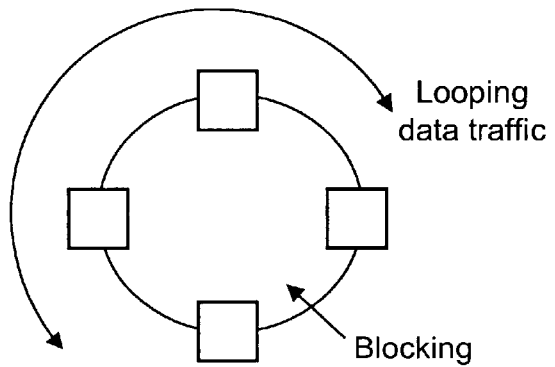
FIG. 2 is a flow diagram showing the use of path blocking to avoid loops in a ring topology.

Before that solution can be understood, however, the problem and solution for the simple single ring scenario must be understood. The basic issue is that the ring topologies shown in FIGS. 1a–1c present Layer 2 traffic looping problems. As illustrated in FIG. 2, in a single ring topology data traffic can circulate around in either direction past their origination and thus create repetition of messages. To prevent looping, one of the paths in the ring must be blocked, as shown in FIG. 2. A ring loop free topology is thus achieved by blocking data traffic in one of the ring ports. The port may be declared to be in a blocking state, in which it does not learn or forward incoming or outgoing traffic. However, in accordance with the invention, the port must be convertible to a forwarding state in case of link failure.

A process for providing rapid fault recovery while preventing loops in a single ring topology (or in each ring in a multiple ring topology when the rings do not share ports) is now described with reference to FIG. 3. The process begins with the selection of one of the bridges in each ring to serve as the master bridge, step 30. This selection may be made manually such as by a system administrator, or may be made through a partially or fully automated process. In any event, the selection of a bridge to be master follows a set of rules described below, and is not performed through a time and computing-resource consuming election process of the type used in the spanning tree algorithm to select a root bridge. One of the two ports in the master bridge is initially chosen to be blocking, step 32. In one embodiment, the port chosen to be blocking is the port with fewer shared rings on the master bridge. All other bridges in the ring maintain their ports in one or more non-blocking states. Thus, the master bridge is the only bridge which can selectively block all traffic and thus prevent a loop. This state is illustrated in FIG. 4, in which the master port 20 has one of its two ports 20a in a forwarding state (designated as F) and the other port 20b in a blocking state (designated as B).

Figure 3:
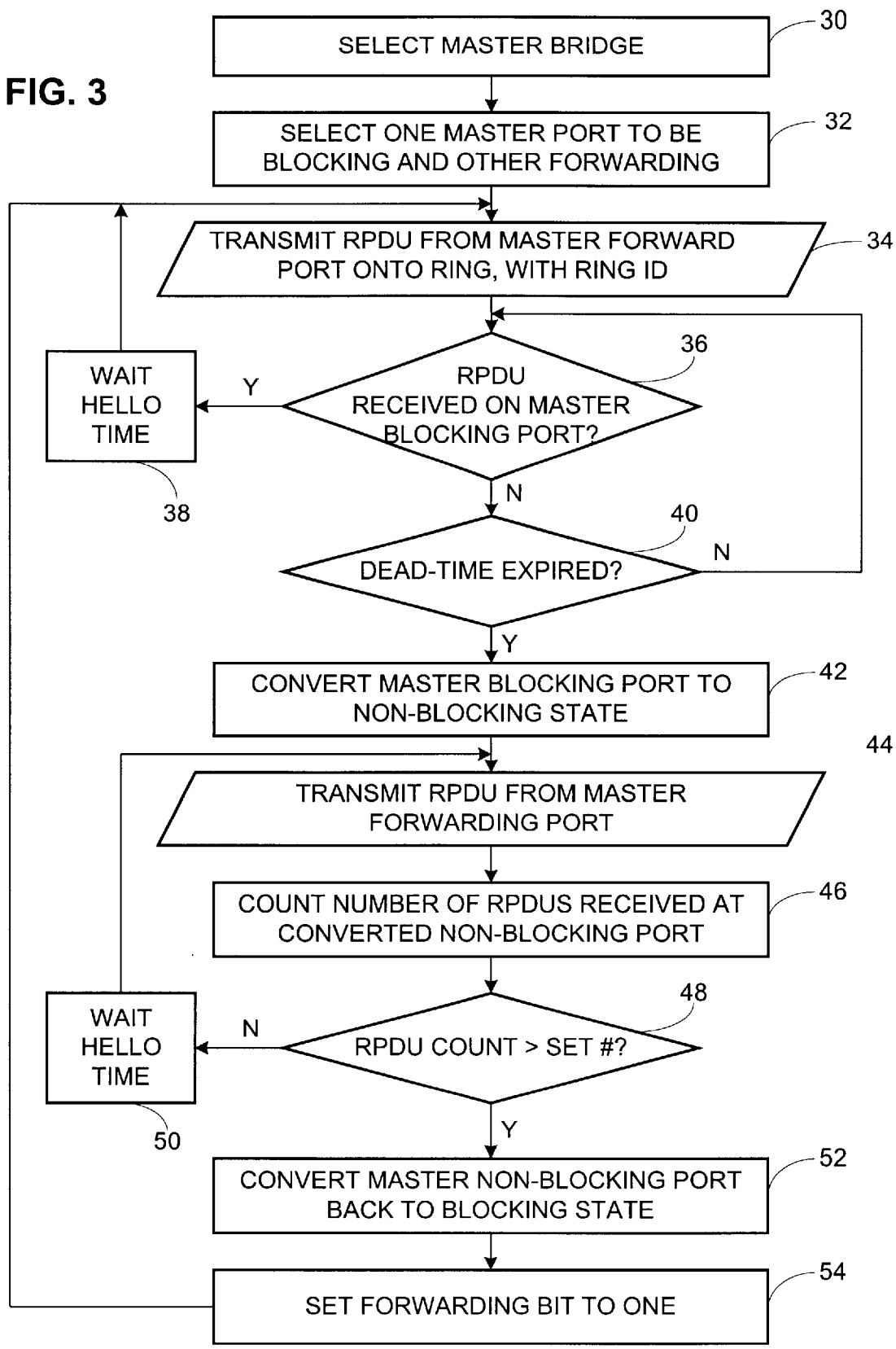
FIG. 3 is a flow chart showing a process of providing fault recovery while avoiding loops in a ring topology, in accordance with one embodiment of the present invention.
Figure 4:
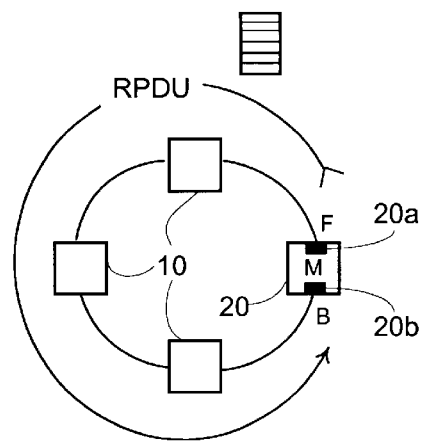
FIG. 4 is a diagram showing a loop-free ring network resulting from the use of the process of FIG. 3.

Further in accordance with the invention, and following in FIG. 3, the master bridge regularly transmits control packets, referred to herein for some embodiments as ring protocol data units or RPDUs, step 34. The master bridge transmits the RPDUs every hello seconds, regardless of other processing occurring in the master bridge such as the processing described below. The value of hello seconds may be preset or may be set by a system administrator through a command line interface. The RPDUs contain, among other fields, a ring identifier which identifies the ring to which the RPDU applies. Every ring has an identifier assigned by the network administrator. This field is not strictly necessary for a single ring, but is useful in allowing rings to be connected and controlled separately, as explained in greater detail below. If the ring is operational and all its links enabled, the blocking port on the master bridge should receive each RPDUs having the ring identifier within a set delay time. The blocking port thus awaits each RPDU, step 36. The master bridge continues sending RPDUs after waiting hello seconds from transmission of the previous RPDU, steps 38, 34.

If a given RPDU for the ring is not received by the blocking port within the set delay time, sometimes referred to herein as dead_time seconds, step 40, then the master bridge interprets this event as the occurrence of a link failure somewhere in the ring, and converts the blocking port to a non-blocking state, step 42. This opens up this master bridge second port to traffic so that affected parts of the ring may receive data traffic. In some embodiments, the blocking port is converted immediately to a forwarding state. In other embodiments, the blocking port is first converted to a pre-forwarding state, in which Layer 2 data traffic is blocked and Layer 2 addresses are not learned but RPDUs are received and processed, and then the port is converted to a forwarding state if RPDUs for the ring are still not received. The use of a pre-forwarding state, among other advantages, allows more time for detection or resolution of the fault in the network before full data traffic is provided through the master bridge, and allows the chance for the master bridge to detect its RPDU and thus return to a blocking state and prevent a loop. In further embodiments, a network administrator may set through a command line interface whether the port first converts to the pre-forwarding state before converting to the forwarding state.

Figure 5:
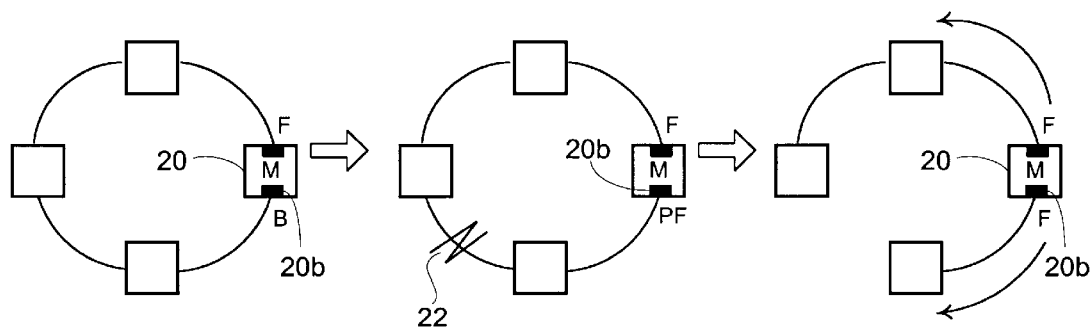
FIG. 5 is a transition diagram showing a loop-free fault recovery in the network shown in FIG. 4 through the use of the process of FIG. 3.

This scenario is illustrated by the transition diagrams shown in FIG. 5. In the first portion, the ring is in a steady state, with one port forwarding and the other blocking. After a link failure 22 occurs in the ring, the blocking port 20b fails to receive a RPDU within dead_time seconds, and the master bridge converts the port to a pre-forwarding state. After an additional time delay with still no RPDU being received, the port 20b is then converted to a fully forwarding state, thus allowing traffic to travel to all bridges in the network via different pathways. If a control packet is received at the port 20b while still in a pre-forwarding state, then the link has been restored and the port 20b may be converted back to a blocking state before it goes to a forwarding state.

Figure 6:
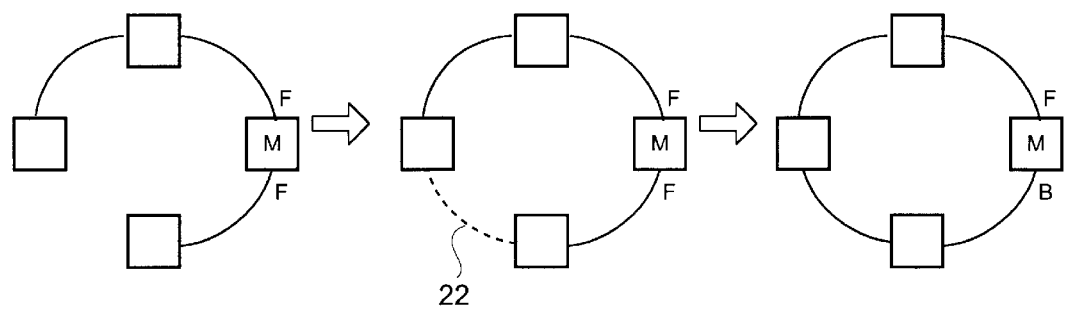
FIG. 6 is a transition diagram showing a restoration of the network shown in FIG. 4 through the use of the process of FIG. 3.

Returning to FIG. 3, the master bridge continues transmitting RPDUs every hello seconds from one another, step 44, and the converted non-blocking port counts the number of RPDUs having the ring identifier it receives, step 46. If the number of RPDUs received for the ring is not greater than a preset number, step 48, this indicates that the link is still broken, and thus the port remains in its non-blocking state and further RPDUs continue to be transmitted every hello seconds from one another, steps 50, 44. If the number of RPDUs received within a given time frame is greater than a preset number, step 48, this indicates that the link has been restored. In order to prevent looping, the master bridge then converts the port back to a blocking state, step 52. This scenario is illustrated in the transition diagram in FIG. 6, in which the failed link 22 gets restored and the master bridge converts the port 20b back to a blocking state B. The master bridge also sets a forwarding flag or bit in the RPDU, step 54, to notify other bridges in the ring that they may transition from a pre-forwarding state to a forwarding state.

Figure 7:
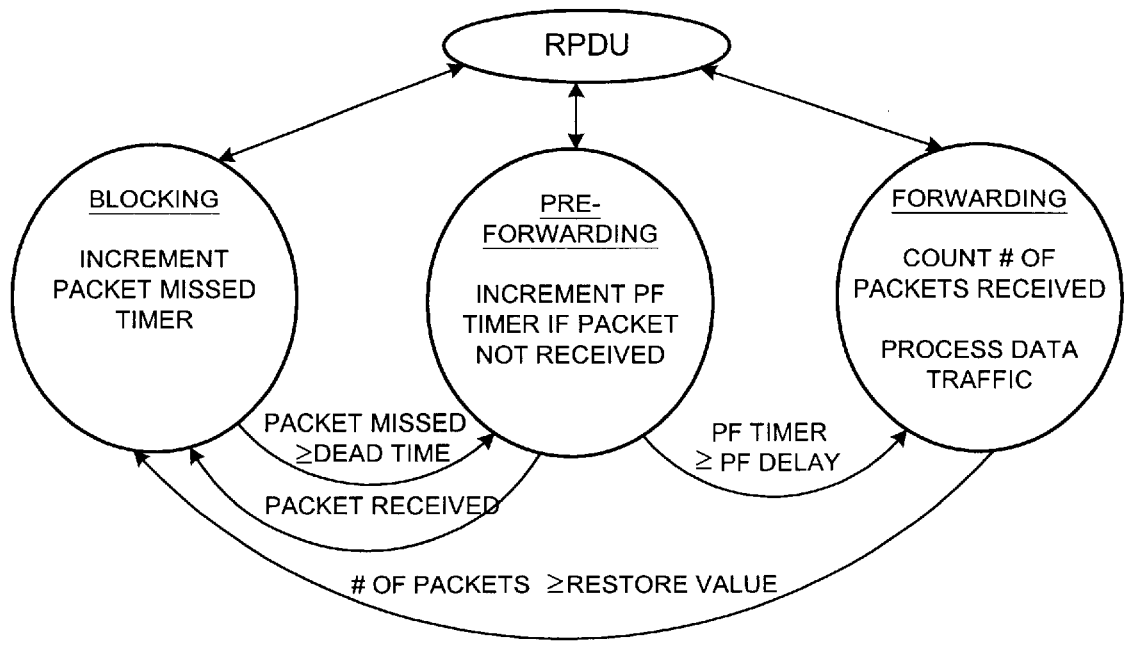
FIG. 7 is a state diagram showing transition between three port states in a master bridge in accordance with one embodiment of the present invention.
Figure 8:
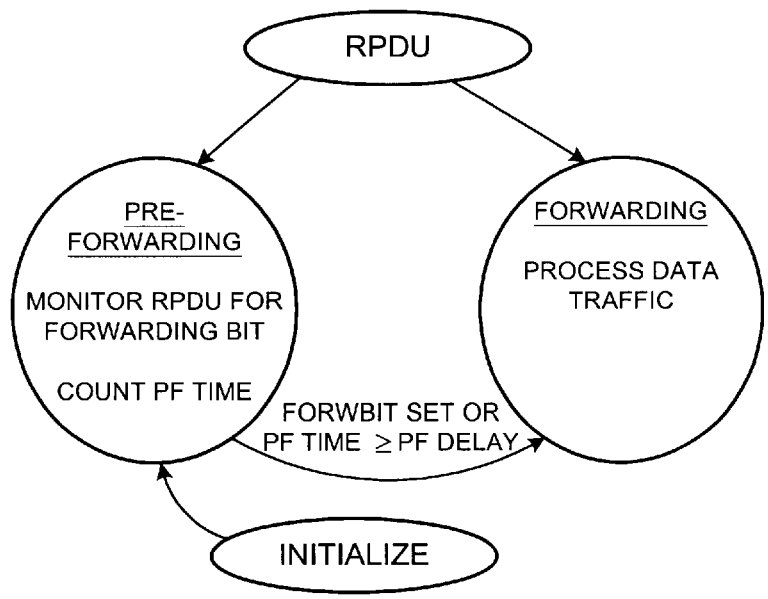
FIG. 8 is a state diagram showing transition between two port states in a non-master bridge in accordance with one embodiment of the present invention.

Thus, in preferred embodiments, one of the master bridge ports transitions between three states—blocking, pre-forwarding, and forwarding. The conditions under which the port undergoes these transitions is summarized in the state diagram in FIG. 7. Non-master bridge ports do not become blocking, but assume one of the two non-blocking states, pre-forwarding or forwarding. These states and their transitions are shown in the state diagram in FIG. 8. When a port becomes enabled it is declared to be in pre-forwarding state. The RPDU contains a forwarding flag set by the master bridge such as, for example as explained above, when the master bridge converts its convertible port from a non-blocking to a blocking state. When each non-master port receives a RPDU passing through with the forwarding flag set, the bridge declares the port to be forwarding. If no RPDU with a forwarding flag set is seen by the port for pf_delay time, the port is declared by the bridge to be forwarding. These transitions are shown in FIG. 8.

Figures 9, 15:
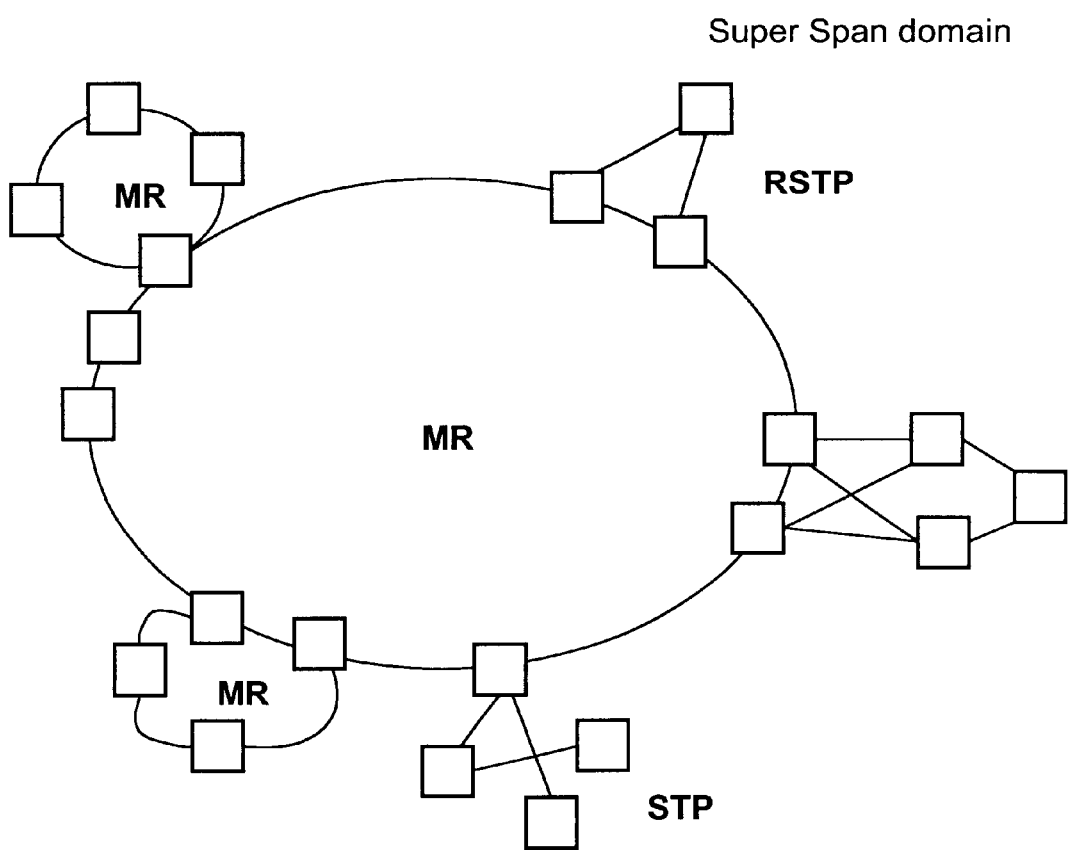
FIG. 9 is a data structure for a ring protocol data unit in accordance with one embodiment of the present invention.
FIG. 15 is a network diagram showing several rings using the network configuration protocol of the present invention connected together and to other network configurations.

The data structure for one embodiment of the RPDU control packet is shown in FIG. 9. This RPDU structure follows a 802.3 packet format, with the source MAC address being the master bridge's MAC address. The packet includes a protocol identifier field, default value of one, and a protocol version field, default value 0. The packet contains three flags: a topology change (tc) flag, set by the master bridge whenever it converts its port between states; a forwarding flag, set by the master bridge to instruct the other bridges to take their ports to forwarding states; and a foreign status flag set by ports to indicate that a control packet has been marked as belonging, or native, to a specific ring even though it will be forwarded to another ring or rings, and is foreign to the other rings, as described in greater detail below. The control packet further includes: a VLAN identifier which takes the value of the master VLAN in a ring VLAN group; a ring identifier, as discussed above, which is assigned the value of the ring to which the packet applies; and a master identifier which represents the identification of the master, which may be the MAC address for the master bridge. A sequence number field allows expansion of the protocol, and a hello time field is set by the master as the period in which the master transmits the hello packets, as represented in 1/256 portions of a second.

When a master bridge port changes from forwarding to blocking state or from blocking to forwarding, the master bridge sets the Topology Change flag in the RPDUs that it is generating. When bridges in the ring receive a RPDU with Topology Change set, they flush their bridging tables. Upon receiving the TC RPDU back, the master bridge sets the flag to be zero, thus deactivating it, since the other bridges in the ring have now adjusted to the topology change.

When a master bridge port goes from pre-forwarding to forwarding, and therefore the ring gets partitioned (see FIG. 5), the master bridge generates RPDUs with TC flag set in both directions of the ring. Since some bridges may not receive the RPDU and thus may not see the TC flag, the master bridge sends the RPDUs with the TC flag set multiple times, e.g., three times. A bridge that has already adjusted to a topology change by flushing its bridging tables as described above which subsequently receives another RPDU with the TC flag set does not flush the other two times it sees the TC flag set.

As explained earlier, one bridge is selected as master for each ring. This selection is performed in accordance with a set of rules, and may be performed manually by the administrator, by the administrator after a software program has excluded certain choices based on the rules, or automatically by a software program which applies the rules to limit the choices and selects one of the remaining viable choices. In one embodiment, the rules are: first, that the master is a bridge that does not have multiple rings configured on its ports; second, that if this is not possible, the master for a particular ring cannot be customer ports, that is, ports that do not belong to the highest priority ring between two or more connected rings, as described further below; and third, that if this is not possible, then ring priorities must be adjusted to allow application of the second rule.

Figure 10:
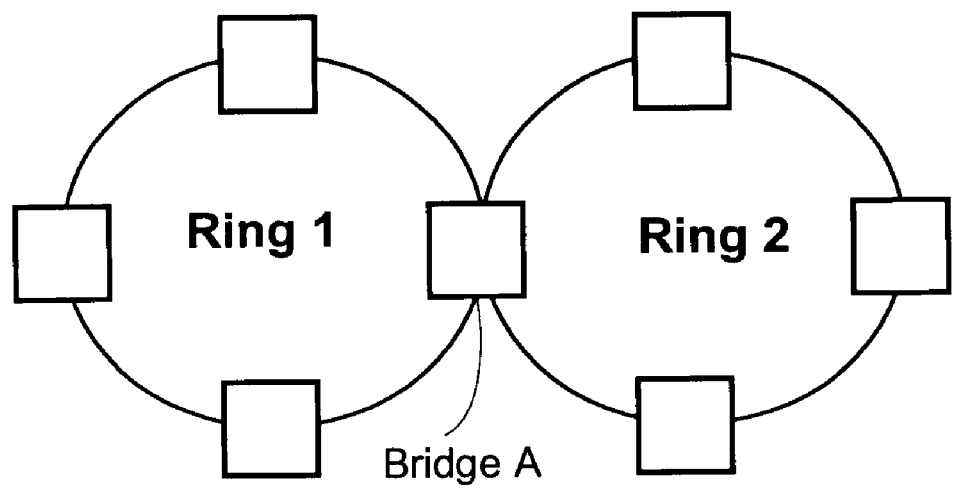
FIGS. 10–14 are network diagrams illustrating various ring topologies in which a selection of a master bridge in each ring is required.
Figure 11:
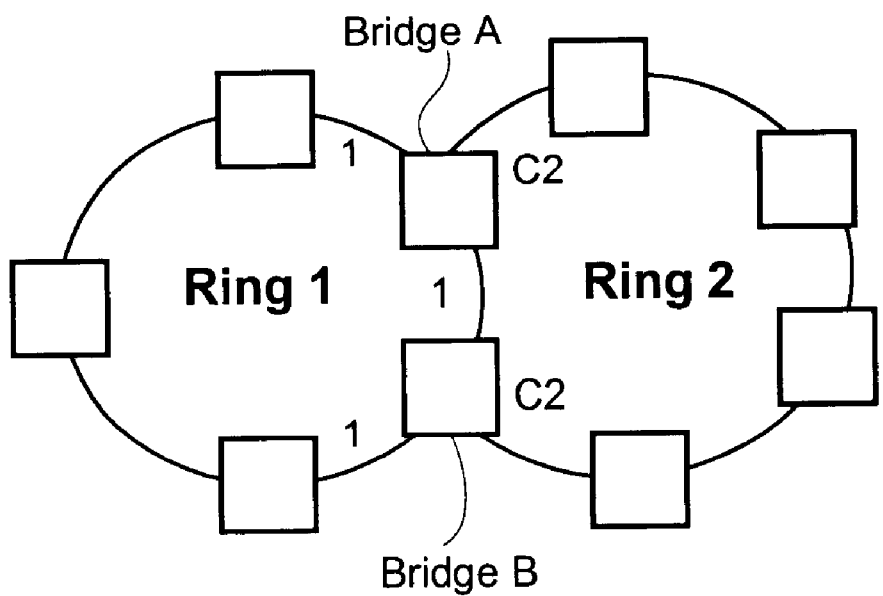
Figure 12:
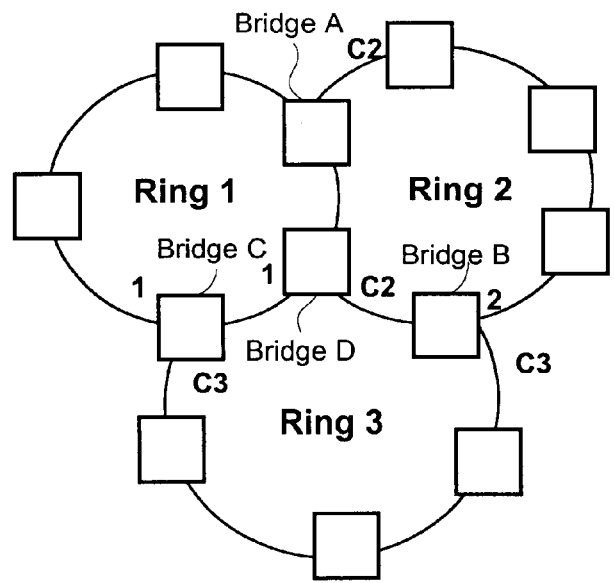

FIGS. 10–14 illustrate various network configurations useful in illustrating applications of these rules. In FIG. 10, all bridges may be masters for their ring. This includes Bridge A, which may be a master for ring 1 or ring 2 since it has no ports shared between ring 1 and ring 2. In FIG. 11, all bridges in ring 1 may be master, including bridges A and B, which have two ports for ring 1. However, bridges A and B may not serve as masters for ring 2 because they do not have two non-customer ports with ring identifier 2. In FIG. 12, all bridges on ring 1 may be chosen as master. Ring two may not choose bridges A and D as masters since they do not have two non-customer ports, but may choose bridge B as master since bridge B has to non-customer ports. Ring three may not choose bridges B, C, or D, but may choose any other bridge as its master.

Figure 13:
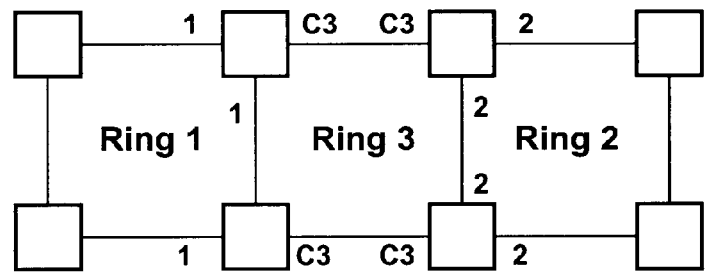
Figure 14:
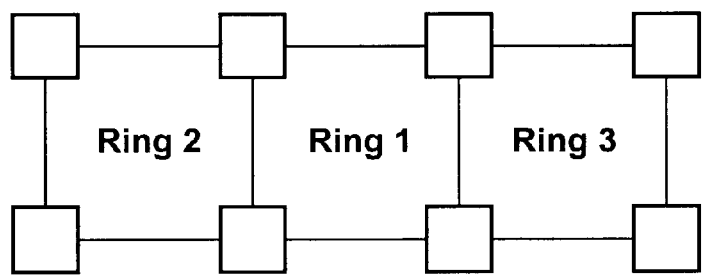

Finally, in FIG. 13, rings 1 and 2 may choose any bridge as master, since all bridges in those rings have two non-customer ports, but ring 3 may not choose any of the four bridges to which it is connected since none has two non-customer ports since ring 3 has the lowest priority. Thus, the topologies in FIG. 13 must be rearranged as shown in FIG. 14 so that the ring with the lowest priority is not the intermediate ring, which allows ring 3 to have at least one, in this case two, bridges to select as master.

Allowing for the combination of ring topologies into a larger network provides for substantial flexibility in the design of a network configuration. For example, as shown in FIG. 15, rings utilizing the inventive protocol described herein, sometimes referred to as metro-rings or MRs, may be combined around a larger metro-ring and with other Layer 2 protocols such as spanning tree protocol (STP) networks. In addition, a metro-ring may be combined at some of its bridges with another network through the Superspan domain available from Foundry Networks of San Jose, Calif., the assignee of the present application. In these combinations, the metro-ring protocol just applies to ports belonging to each specific ring.

Figure 16:
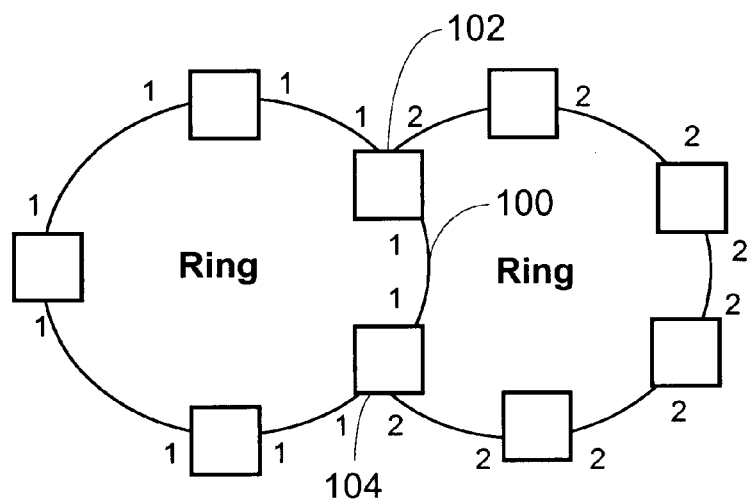
FIG. 16 is a network diagram illustrating shared bridges between two rings and the assignment of port identifiers in accordance with one embodiment of the present invention.

Several aspects of the RPDU protocol described above help keep protocols separate among different rings in a larger network. Each ring is assigned a ring identifier. Ring identifiers may be ranked according to priority, with, in one embodiment, the priorities being inversely related to the ring identifier value. That is, the lower the ring identifier, the higher the priority. The ring identifier is used to identify all ports belonging to the ring. In addition, each port gets assigned a single port identifier. If the port is not shared between rings, the port identifier is the same as the ring identifier for the ring to which the port belongs. If the port is shared among different rings, the port is assigned the identifier of the higher or highest priority ring. An example of port identifier assignments is shown in FIG. 16. The ports connected to the path 100 between shared bridges 102, 104 are assigned the port identifier 1, matching ring 1, since ring 1 has a higher priority than ring 2.

Figure 17:
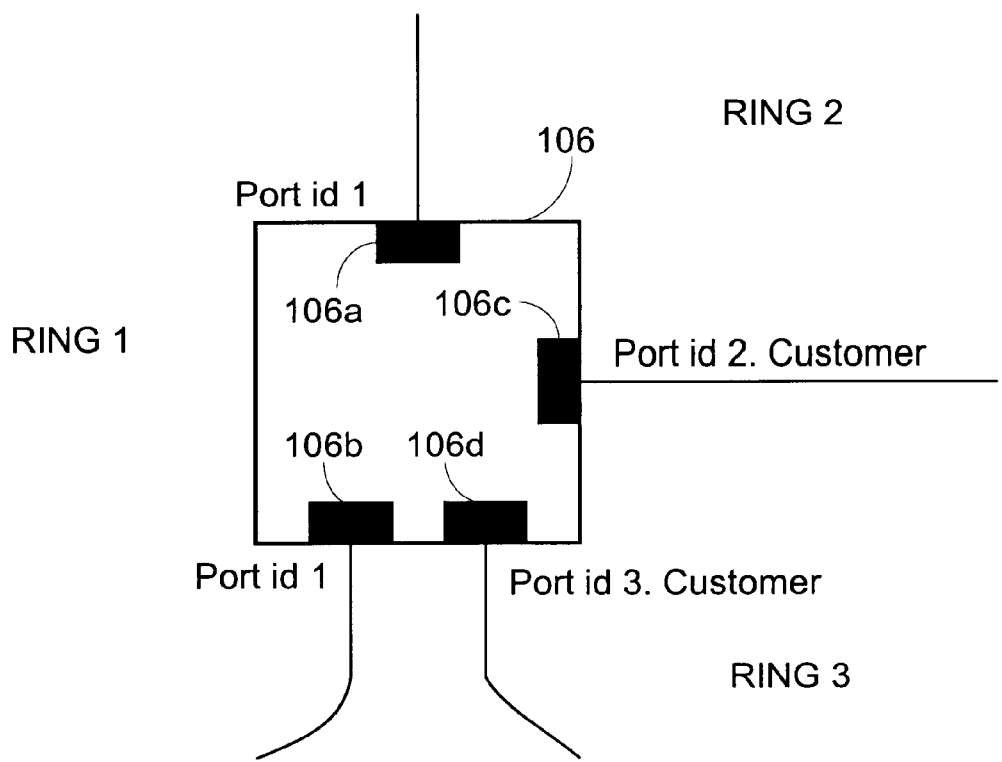
FIG. 17 is a diagram of a shared bridge with port identifiers being assigned as regular or customer ports based on ring priority values.

As explained above, all ports in a shared bridge that do not belong to the highest priority ring are declared as customer ports. FIG. 17 illustrates a bridge 106 having four ports 106a, 106b, 106c, 106d connected to rings. Ports 106a and 106b are connected to ring 1, and thus assume the highest priority. Ports 106c and 106d are assigned to lower priority rings, ring 2 and ring 3, respectively, and are thus declared to be customer ports.

Figure 18:
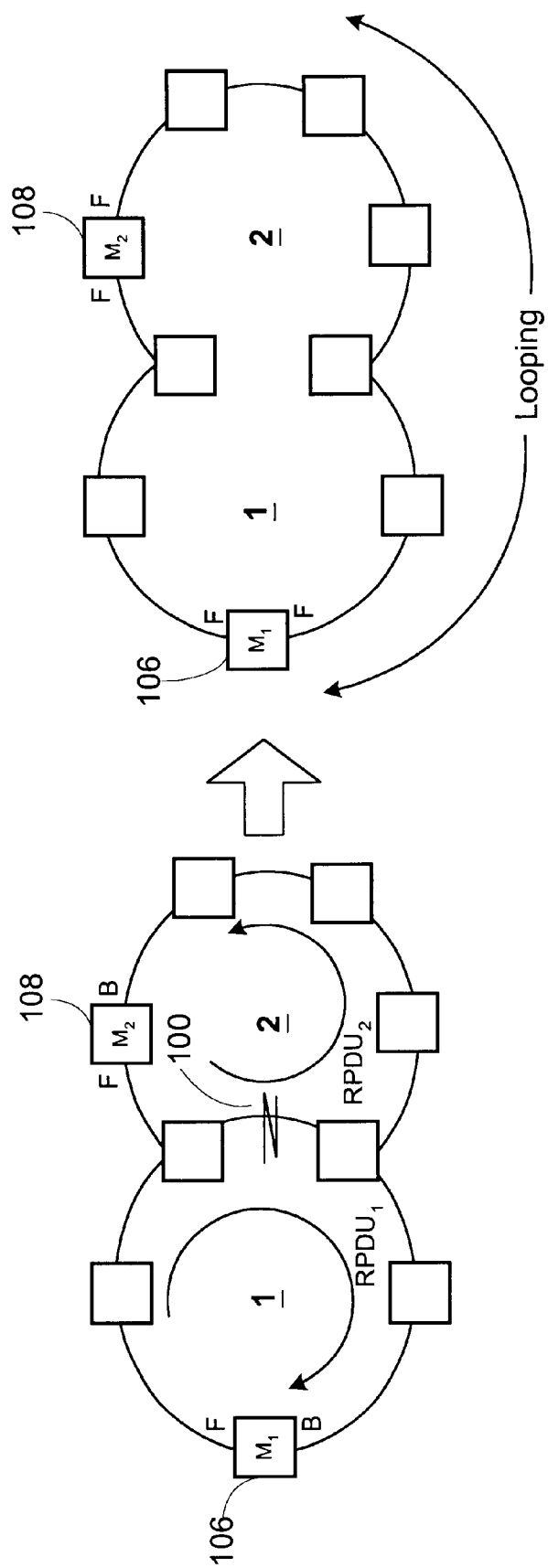
FIG. 18 is a transition diagram illustrating the loop that arises when a shared link fails between a connected ring topology such as the one shown in FIG. 17.

As mentioned above, when rings are connected in such a way as to have shared links between shared bridges each having regular and customer ports, a mechanism is needed to recover from a fault in the shared link without creating a loop. For example, if each of two connected rings were to have a master bridge which independently decided whether to open a convertible port to a forwarding state in case of a link failure, then the result of a shared link failure is a single larger ring in a loop. This scenario is shown in FIG. 18. In the drawing, each of rings 1 and 2 circulates RPDUs only within its own ring. If the shared link 100 fails, both master bridges, master bridge 106 for ring 1 and master bridge 108 for ring 2, fail to receive their respective RPDUs and determine that a link failure has occurred. Both master bridges then independently transition their blocking ports to a non-blocking state, e.g., first to a pre-forwarding state and then to a forwarding state, in order to effectuate fault recovery. The result, as shown in the right hand side of FIG. 18, is a single loop formed by the combination of the two previously separate rings, with all ports in a forwarding state, including both ports in each master bridge 106, 108. As can be readily seen, this results in an undesirable looping situation.

In accordance with the invention, in order to prevent this looping situation, at least one of the two rings must be aware of the state and carry RPDUs for the other. Each bridge is therefore programmed with software to follow a set of rules designed to keep RPDU messages separate but available to the proper rings in a connected network topology. The following are the rules that ring ports follow in one embodiment regarding RPDU transmission if they are in forwarding or pre-forwarding state. In blocking state the ports drop all RPDUs. The rules for port behavior are summarized in Table I, provided below, and in FIG. 19.

Rule 1: A customer port marks incoming RPDUs as native to its ring by setting the foreign status flag, and changes the RPDU MAC address.

Rule 2: A customer port de-marks marked RPDUs (by resetting the foreign status flag to null) if the marked RPDU has the same ring identifier as the port identifier.

Rule 3: A ring port drops all marked RPDUs with higher priority than the port identifier itself.

Rule 4: Upon receiving a marked RPDU, a bridge checks if any if its ports is a customer port for that RPDU. If yes, the bridge de-marks the RPDU and sends it in the customer port. In any other case, it broadcasts the marked RPDU in all the ports that have an identifier with higher priority than the RPDU (following Rule 3).

TABLE I

| RPDU type | Port Type | RPDU priority ≧ Port priority | action |
| --- | --- | --- | --- |
| Regular | Regular | N/A | Send RPDU to other ring port |
| Regular | Customer | N/A | Mark RPDU with port identifier and broadcast in all ports with higher priority |
| Marked | Regular | NO | Drop RPDU |
| Marked | X | YES | If bridge has a customer port for RPDU ring identifier, de-mark RPDU and send it on that port. If bridge has no customer port for the RPDU ring identifier, broadcast marked RPDU on all ports with higher priority. |
| Marked | Customer | NO | Drop RPDU |

Figure 19:
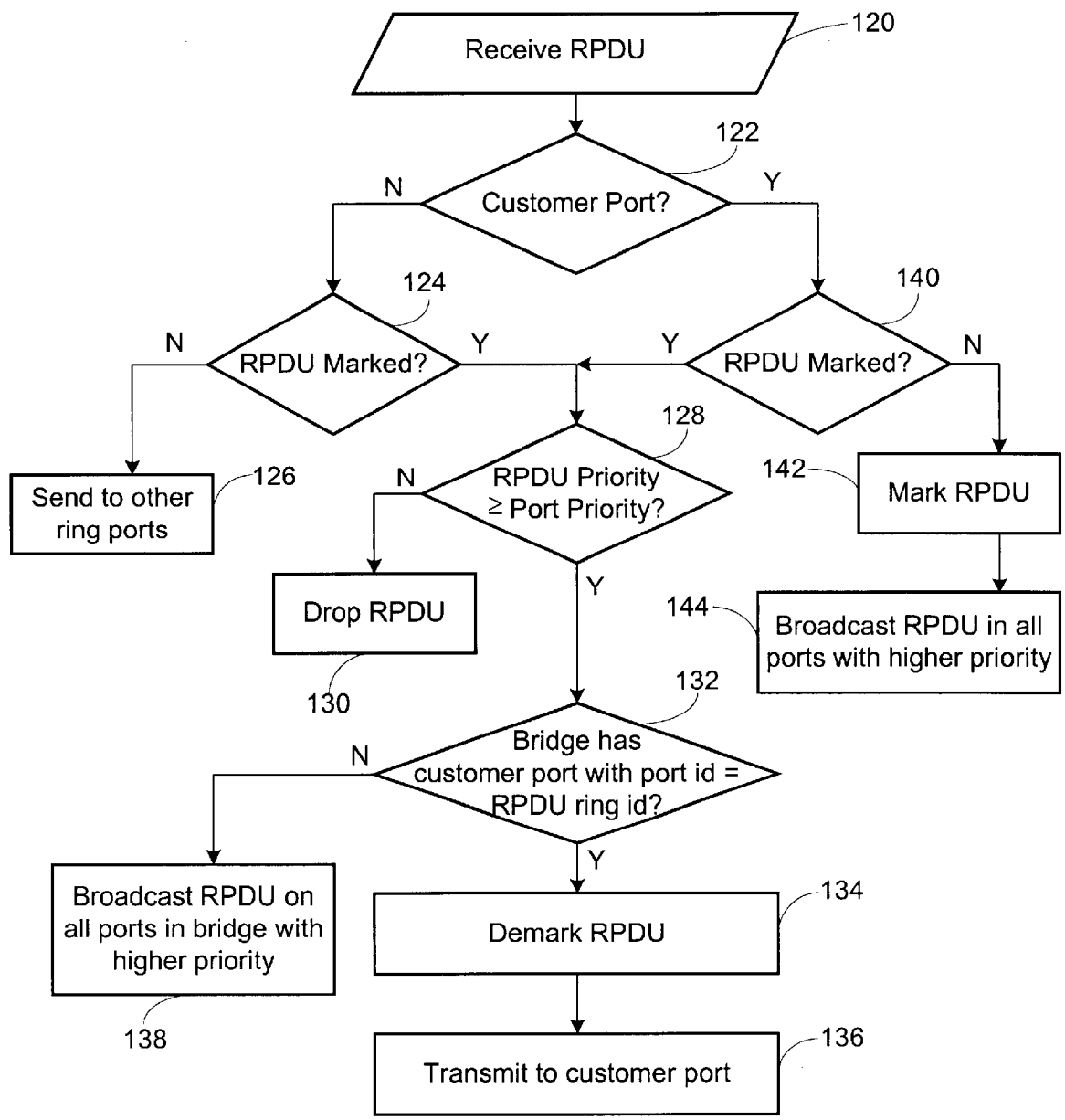
FIG. 19 is a flow chart showing a process of sharing control packets between different connected rings in accordance with one embodiment of the present invention.

These rules are also exemplified by the process shown in FIG. 19. When a RPDU is received at a port, step 120, the port runs a different subroutine depending upon whether it is a customer port or not, step 122. For regular (non-customer) ports, the port checks whether the RPDU is marked by having the foreign status flag set, step 124. If the flag is not set, the RPDU is transmitted to the other ring ports, step 126. Thus, regular ports simply forward on regular RPDUs. If the RPDU is marked, then the port determines whether the RPDU ring identifier has a higher or equal priority than the priority of the port identifier, step 128. If not, the port drops the RPDU, step 130, since lower priority rings do not carry RPDUs for higher priority rings. If the RPDU has higher priority than the port, then the bridge determines whether it has a customer port with a port identifier the same as the RPDU ring identifier, step 132. If such a customer port exists in the bridge, the RPDU is de-marked, step 134, and transmitted to the customer port, step 136. Thus, the RPDU is then transmittable back onto its proper ring without any marking, that is, as a foreign control packet.

If the bridge does not have a customer port matching the RPDU ring identifier, then the RPDU is broadcast on all ports in the bridge having higher priority than the RPDU, step 138. The RPDU continues to be marked with the foreign status flag, so that the higher priority rings are aware that this RPDU belongs to a different, lower priority ring and must be forwarded to prevent the looping situation outlined above.

If the port is a customer port, then the port runs a subroutine to determine first whether the RPDU is marked, step 140. If not, the customer port marks the RPDU by setting its foreign status flag, step 142, and broadcasts the marked RPDU in all ports in the bridge having higher priority than the RPDU ring identifier, step 144. If the RPDU is marked, then the port checks whether the RPDU priority is higher than or equal to the port priority, step 128. The process continues as explained above with reference to regular ports.

Figure 20:
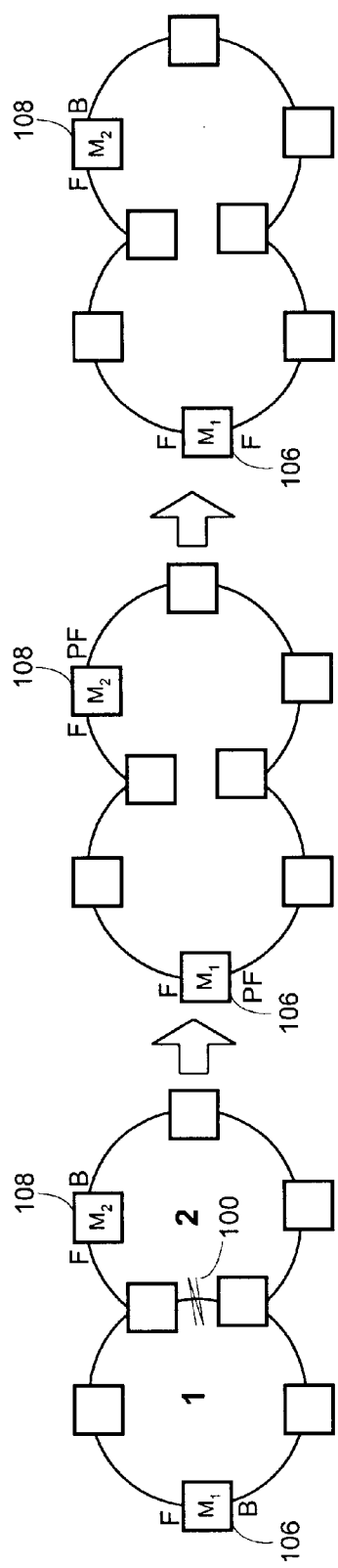
FIG. 20 is a transition diagram showing fault recovery in the connected ring topology of FIG. 17 when a shared link fails, in accordance with one embodiment of the present invention.
Figure 21:
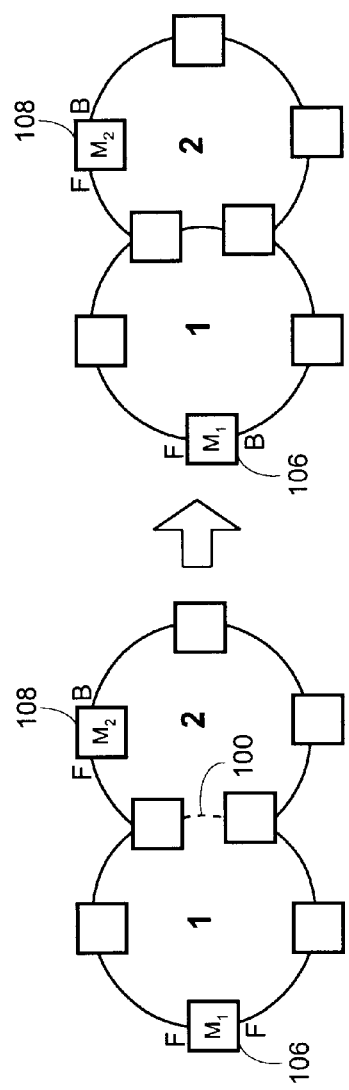
FIG. 21 is a transition diagram showing a restoration of the shared link between connected rings, in accordance with one embodiment of the present invention.

Fault recovery and loop prevention in connected rings is shown in FIGS. 20–21. Starting with FIG. 20, if the shared link 100 fails, both master bridge 106 for ring 1 and master bridge 108 for ring 2 encounter delays in receiving their RPDUs, and thus convert their convertible ports from blocking states to pre-forwarding states, in accordance with the processes described above. However, since ring 1, the higher priority ring, carries the RPDUs for ring 2, according to the rules just described, the RPDUs for ring 2 eventually arrive at the master bridge 108 for ring 2. When that occurs, the ring 2 master bridge 108 converts the convertible port back from its pre-forwarding state to a blocking state. The master bridge 106 for ring 1 still does not receive its RPDUs, since they are not carried in ring 2 bridges, and thus the master bridge converts its convertible port to a forwarding state. The final state, as shown on the right in FIG. 20, is a single ring with one master bridge having gone fully forwarding and the other with one port still blocked, thus providing fault recovery and no looping.

The link restoration scenario is illustrated in FIG. 21. When shared link 100 gets restored, ring 1 RPDUs are again circulating and are then received by the ring 1 master bridge 106. That master bridge 106 then converts its convertible port back to a blocking state, avoiding looping.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. In a network topology comprising a plurality of rings, each ring having a plurality of bridges each having a plurality of ports, two of which ports belonging to the respective ring, wherein one of the plurality of bridges in each ring serves as a master bridge for the ring, the master bridge having a first port belonging to the first ring which is convertible between a blocking state and a non-blocking and a second port being maintained in a non-blocking state, and wherein all ports for other bridges belonging to each ring other than the master bridge are maintained in non-blocking states, a method for facilitating rapid traffic recovery while avoiding loops, the method comprising:

regularly transmitting first control packets from a first master bridge onto a first ring, the first control packets each including a first ring identifier identifying the first ring;

regularly transmitting second control packets from a second master bridge onto a second ring, the second control packets each including a second ring identifier identifying the second ring;

the one or more other bridges in the first ring forwarding the first control packets and, when available to the first ring, any second control packets; and if any first or second control packet is not received by the convertible blocking port for the first or second master bridge, respectively, within a set delay time from transmission of such first or second control packet, then convening the convertible port for the first or second master bridge, respectively, from a blocking state to a non-blocking state.

2. The method of claim 1, wherein regularly transmitting first and second control packets comprises transmitting control packets each including a topology change flag, and wherein the first or second master bridge sets the topology change flag in at least one control packet transmitted following conversion of the first or second master bridge first port from a blocking state to a non-blocking state.

3. The method of claim 2, comprising the other bridges in the first and second rings each storing bridging tables and each of the other bridges flushing its stored bridging table upon receipt of a control packet having a set topology change flag.

4. The method of claim 1, comprising the first master bridge convertible port receiving one or more subsequent first control packets while in a non-blocking state and converting the master bridge convertible port from a non-blocking state to a blocking state if a set threshold number of the subsequent first control packets are received.

5. The method of claim 4, wherein the set threshold number of subsequent first control packets comprises one subsequent control packet.

6. The method of claim 4, wherein the set threshold number of subsequent first control packets comprises more than one subsequent control packet, comprising counting the number of subsequent first control packets received for comparison to the set threshold number.

7. The method of claim 4, wherein regularly transmitting first control packets comprises transmitting a first control packet including a topology change flag, and wherein the first master bridge sets the topology change flag in at least one first control packet transmitted following conversion of the master bridge convertible port from a non-blocking state to a blocking state.

8. The method of claim 1, wherein converting the first or second master bridge convertible port from a blocking state to a non-blocking state comprises converting the convertible port to a forwarding state.

9. The method of claim 1, wherein the first ring comprises a ring VLAN group, and wherein regularly transmitting first control packets comprises transmitting first control packets including a VLAN identifier identifying a master VLAN in the VLAN group.

10. The method of claim 1, wherein regularly transmitting first and second control packets comprises transmitting control packets each including a hello time identifying a period in which the first and second control packet is regularly transmitted by the first and second master bridge, respectively.

11. The method of claim 1, wherein converting the first or second master bridge convertible port from a blocking state to a non-blocking state comprises converting the convertible port to a pre-forwarding state in which the convertible port transmits and processes control packets but does not transmit data traffic.

12. The method of claim 11, wherein, if any first or second control packet is not received by the first or second master bridge convertible port, respectively, within a second set delay time from transmission of such control packet from the first or second master bridge, then converting the master bridge convertible port from a pre-forwarding state to a forwarding state.

13. The method of claim 12, wherein at least one bridge is a shared bridge having a shared port belonging to both the first and second rings, wherein the first ring has a higher priority than the second ring, and comprising assigning a port identifier to the shred port comprising the ring identifier for the first ring.

14. The method of claim 13, comprising marking a second control packet received by a port in the shared bridge belonging to the second ring.

15. The method of claim 14, comprising, in each port of the shared bridge belonging to the second ring, de-marking a received marked control packet having a ring identifier which is the same as the port identifier of the port and dropping a received marked control packet having a ring identifier with a higher priority than the port identifier.

16. In a network comprising a plurality of connected rings, each ring being assigned a priority value different than priority values of other connected rings, a method for coordinating control of fault recovery between the rings, the method comprising:

monitoring health of each ring trough the use of control packets regularly transmitted and expected to be received by a master bridge of each ring, the master bridge converting one of its ports from a blocking state to a non-blocking state if a control packet is not received within an expected time delay from transmission;

each ring forwarding control packets belonging to the ring and any other connected ring having lower priority than the ring.

17. The method of claim 16, wherein the network comprises at least one shared link between two connected rings, and wherein the method comprises, if the shared link fails, forming a single ring from the two connected rings.

18. The method of claim 17, comprising, if the shared link fails, the master bridge for the ring having the highest priority monitoring health of the formed single ring.

19. In a network topology comprising a plurality of rings, each ring having a plurality of bridges each having a plurality of ports, two of which ports belonging to the respective ring, wherein one of the plurality of bridges in each ring serves as a master bridge for the ring, the master bridge having a first port belonging to the first ring which is convertible between a blocking state and a non-blocking and a second port being maintained in a non-blocking state, and wherein all ports for other bridges belonging to each ring other than the master bridge are maintained in one of a plurality of non-blocking states, a method for facilitating rapid traffic recovery while avoiding loops, the method comprising:

converting the convertible port of the master bridge to a blocking state;

setting a forwarding flag in a control packet;

transmitting the control packet from the master bridge forwarding port onto the first ring;

in each bridge belonging to the first ring other than the master bridge, upon receipt of the control packet with the set forwarding flag, converting all ports to a forwarding state.

20. A network in which each of a plurality of bridges has a plurality of ports, two of which ports belonging to a first ring, the network comprising:

a master bridge in which a first port belonging to the first ring is maintained in one or more non-blocking states and a second port is convertible between a blocking state and one or more non-blocking states, the master bridge comprising transmission means for regularly transmitting first control packets onto the first ring, the control packets each including a ring identifier identifying the first ring;

one or more non-master bridges in which both ports belonging to the first ring are maintained in non-blocking states, the non-master bridges forwarding first control packets and second control packets belonging to a second ring connected to the first ring; and program means in the master bridge for converting the convertible port from a blocking state to a non-blocking state if a first control packet is not received byte master bridge within a first delay time from transmission of such first control packet from the master bridge and for converting the convertible port from a non-blocking state to a blocking state if a set threshold number of first control packets is received by the second port while in a non-blocking state.

21. The network of claim 20, comprising means for distinguishing between first control packets belonging to the ring and second control packets belonging to the second ring.

22. The network of claim 21, wherein the means for distinguishing between first and second control packets comprises a foreign status flag in the control packets which is set when a control packet belongs to the second ring.

23. The network of claim 22, wherein the means for distinguishing between first and second control packets comprises program code residing in the bridges in the first ring which, when executed, causes the bridges to detect the foreign status flag in each control packet and to determine whether each control packet belongs to the first or second ring.

24. The network of claim 20, wherein at least one of the bridges in the ring comprises a shared bridge having one or more ports belonging to the second ring.

25. The network of claim 24, wherein the first ring has higher priority than the second ring, and wherein the one or more ports in the shared bridge belonging to the second ring mark control packets belonging to the second ring as native to the second ring and transmit the marked control packets to the ports belonging to the first ring.

* * * * *